United States Patent
King

(10) Patent No.: US 6,497,382 B2
(45) Date of Patent: Dec. 24, 2002

(54) CORD HOLDER

(76) Inventor: Michael R. King, 208 Wharf St., Herman, MO (US) 65041

( * ) Notice: Subject to any disclaimer, the term of this patent is extended or adjusted under 35 U.S.C. 154(b) by 0 days.

(21) Appl. No.: 10/001,300

(22) Filed: Nov. 1, 2001

(65) Prior Publication Data

US 2002/0084374 A1 Jul. 4, 2002

Related U.S. Application Data

(63) Continuation-in-part of application No. 09/753,534, filed on Jan. 2, 2001, now Pat. No. 6,425,543.

(51) Int. Cl.$^7$ ................................................ B65H 75/38
(52) U.S. Cl. ..................................................... 242/405.2
(58) Field of Search ............................. 242/388, 388.1, 242/405, 405.1, 405.2, 613.3, 579, 580; 191/12 R, 12.2 R; 206/409, 702

(56) References Cited

U.S. PATENT DOCUMENTS

| | | | | |
|---|---|---|---|---|
| 1,178,056 A | * | 4/1916 | Craig | 242/405.1 |
| 2,470,212 A | * | 5/1949 | Carlson | 242/405.1 |
| 2,472,300 A | * | 6/1949 | Kemplin | 242/405.1 |
| 2,532,394 A | * | 12/1950 | D'Amico | 242/405.1 |
| 2,590,695 A | * | 3/1952 | Gomberg | 242/405.1 |
| 2,626,762 A | * | 1/1953 | Zick | 242/405.1 |
| 3,042,337 A | * | 7/1962 | Dinneen | 242/405 |
| 3,803,650 A | * | 4/1974 | D'Amico | 242/613.3 |
| 3,934,838 A | * | 1/1976 | D'Amico | 242/405.1 |
| 4,779,815 A | * | 10/1988 | Moore et al. | 242/405.1 |
| 5,924,643 A | * | 7/1999 | Campana | 242/405.1 |
| 6,425,543 B1 | * | 7/2002 | King | 242/405.2 |

* cited by examiner

Primary Examiner—William A. Rivera
(74) Attorney, Agent, or Firm—Jacobson & Johnson

(57) ABSTRACT

A cord holder having a body member with cord retaining regions on each end with the body member having a temporally securable closure member on each end to allow quick passage of a cord into the cord retaining regions with the securable closure members securable to each other to hold the cord on the body member and the body member having an integral flexible member for securing and end of a cord to be wound thereon as one begins to wind the cord around the cord holder.

15 Claims, 3 Drawing Sheets

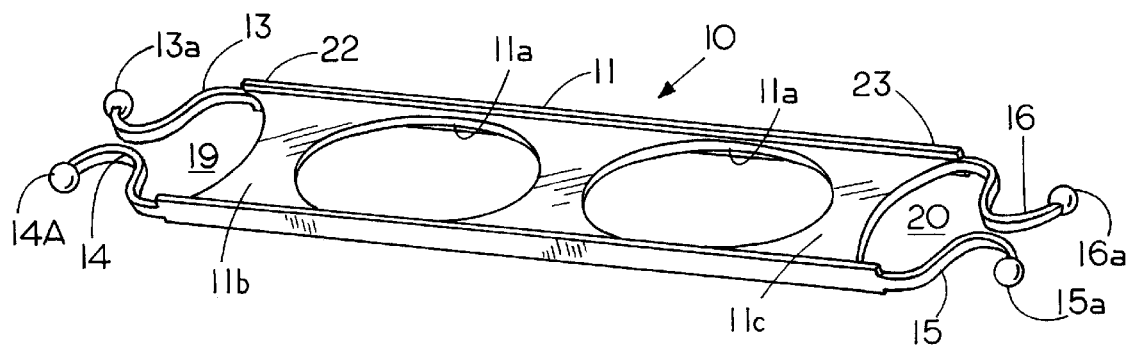
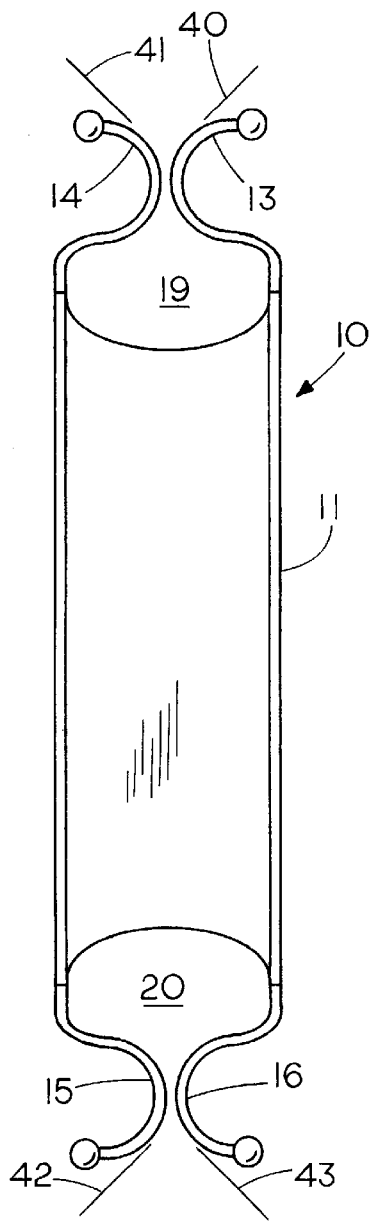
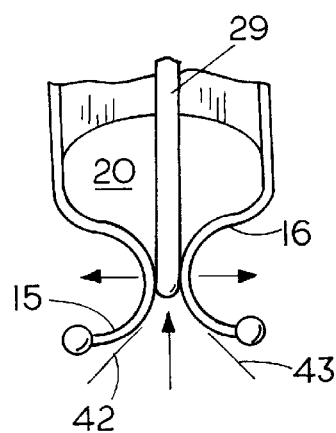
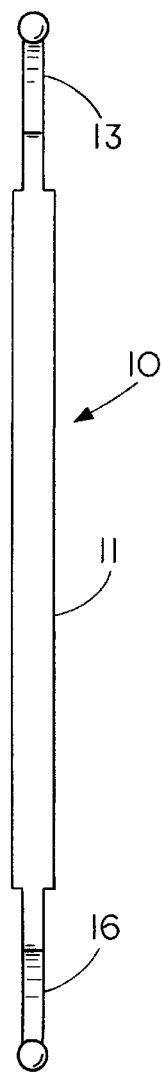
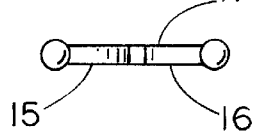

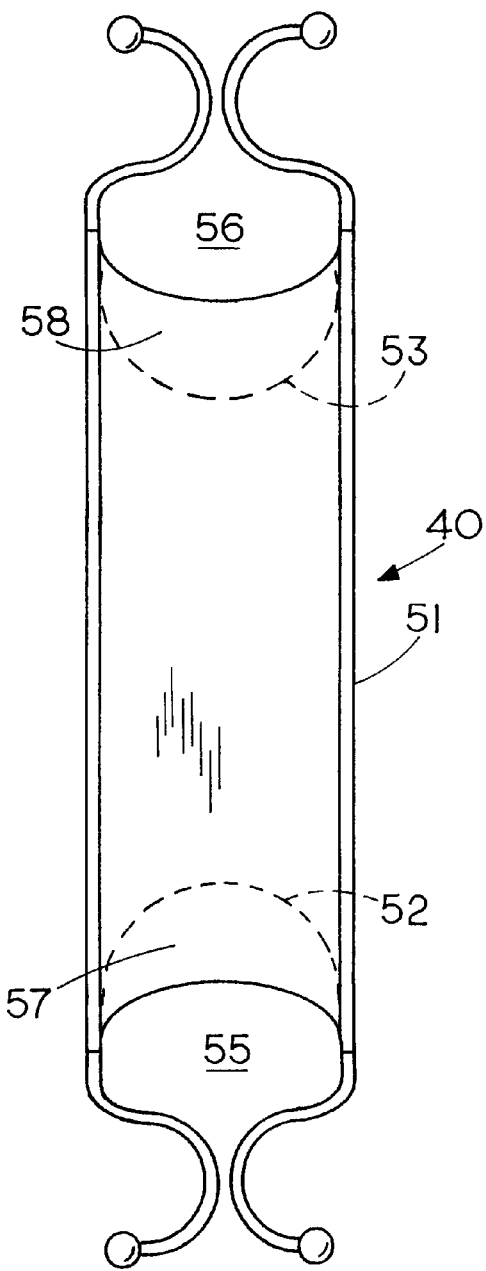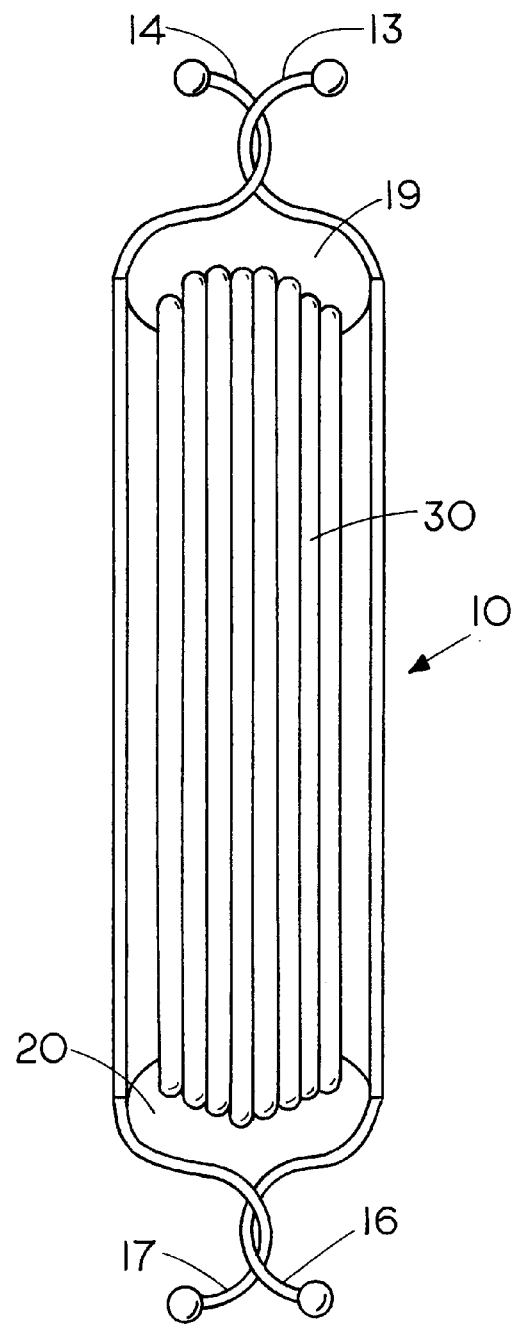

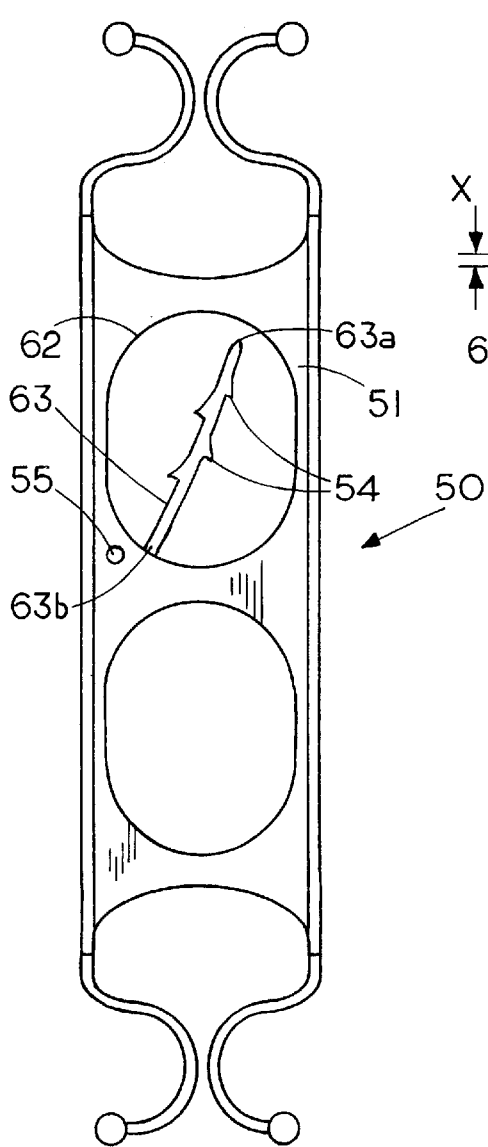
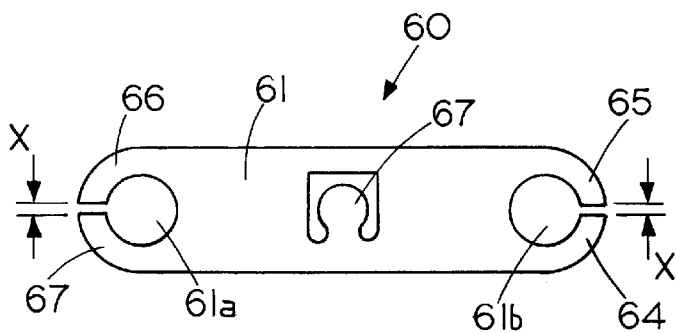
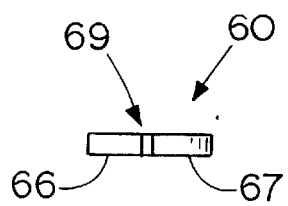
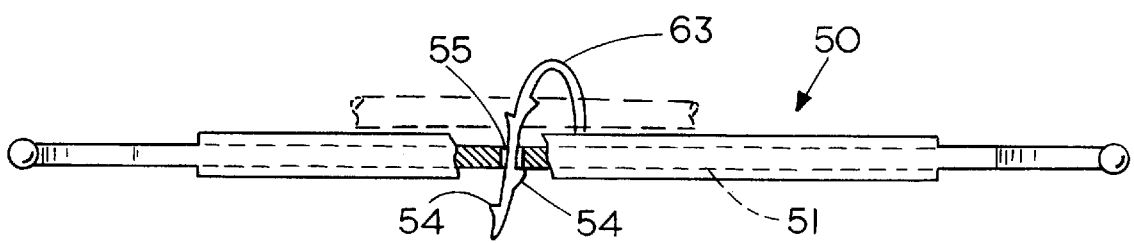

CORD HOLDER

CROSS REFERENCE TO RELATED APPLICATIONS

This application is a continuation in part of application Ser. No. 09/753,534 Filed Jan. 2, 2001 titled Cord Holder now U.S. Pat. No. 6,425,543.

STATEMENT REGARDING FEDERALLY SPONSORED RESEARCH OR DEVELOPMENT

None

REFERENCE TO A MICROFICHE APPENDIX

None

FIELD OF THE INVENTION

This invention relates to cord holders and more specifically to improvements to cord holders that allows a user to wrap a cord around the cord holder as securable closure members on the end of the cord holder flex apart to allow the cord to be wound around the cord holder.

BACKGROUND OF THE INVENTION

The concept of cord holders for electrical cords is known in the art. Typically, the cord holders comprise an elongated member having an open ended U-shaped recesses on each end of the cord holder for preventing a cord from falling off the cord holder. Generally, the end of cord is secured to some type of clip to prevent the cord from unwinding. Typical of such prior art cord holders is shown in U.S. Pat. No. 4,123,012 which discloses a cord holder with side clips for holding the end of the cord in position. One of the difficulties with such cord holders is that invariably the end of the cord cannot be hooked into the clip either because the length of the unwound cord is either to long or too short. Consequently, as a result the cord is likely to unwind or at least partially unwind during the handling of the cord holder.

While means such as cable ties are known in the art and are used to hold a plurality of wires cables in a bundle. The cable ties are tied at spaced intervals along the length of a plurality of wires or cables to hold the multiple wires or cables as a single cable. As cable ties are for holding wires in a group they are not suitable for temporarily storing extension cords, such as computer cords. An example of a cable tie, which is used to bundle wires is sold under the tradename Flip-Clip™ by A very Dennison.

One of the methods of preventing a cord from unwinding on a cord holder involves the application of electrical tape around the end of the cord and a portion of the cord holder to maintain the cord on the cord holder. With the present invention no additional fasteners are required since the closure members are permanently attached or are integral to the cord connector to always be in a ready condition for maintaining a cord on the cord holder.

The present invention provides an improved cord holder wherein a cord can be temporarily stored by winding the cord around a body member which includes securable closure members on each end that even though they remain on the end of the cord holder they do not hinder the winding of the cord but instead form a guide surface for guiding the cord into the cord retaining regions of the cord holder. That is, the legs on the closure members flex and separate in response to the winding pressure of the cord to allow the cord to slide pass the closure members and be wrapped around the body of the cord holder. Once the cord is wound on the cord holder the user does not need to search for electrical tape or the like to secure the cord since the securable closure members are in a ready condition for the user to quickly secure the loose end of the cord in a retained position on the cord holder and thereby prevent the accidental unwinding of the cord during subsequent handling of the cord holder.

SUMMARY OF THE INVENTION

A cord holder having a body member with cord retaining regions on each end with the body member having a securable closure member on each end to allow quick passage of a cord into the cord retaining regions with the closure members including legs to hold the cord on the body member and prevent the accidental unwinding of the cord from the cord holder and a flexible member extending from the body member to secure an end of a cord thereto as one begins the process of winding the cord around the cord holder.

BRIEF DESCRIPTION OF THE DRAWINGS

FIG. 1 is a perspective view of the cord holder of the present invention;

FIG. 2 is a front or back view of the cord holder for wrapping a cord thereon;

FIG. 2a is a partial front view of the cord holder showing the flexing of the closure members to allow a cord to be wrapped around the cord holder;

FIG. 3 is a left side or right side view of the cord holder of FIG. 2;

FIG. 4 is a top or bottom view of the cord holder of FIG. 2;

FIG. 5 is a front view of an alternate embodiment of the cord holder of FIG. 2;

FIG. 6 is a front view of the cord holder of FIG. 2 with the closure members maintaining a wound cord therein; and FIG. 7 is a front view of a cord holder having an integral flexible member for securing an end of a cord to the cord holder;

FIG. 8 is a side view of the cord holder of FIG. 7 holding an end of a cord in postion on the cord holder;

FIG. 9 is a front view of an alternate embodiment of my cord holder having flexible arms to permit passage of cord between ends of the flexible arms; and FIG. 10 is an end view of the cord holder of FIG. 9.

DESCRIPTION OF THE PREFERRED EMBODIMENT

FIG. 1 shows a perspective view of an integral, one-piece cord holder 10 for storing electrical and computer cords. Cord holder 10 includes an elongated body member 11 having a pair of relief areas 11a therein. Relief areas 11a are optional as seen in the embodiments of FIGS. 2 to 6. The body member 11 has a first end 22 and a second end 23. FIGS. 7–10 show the cord holder having an integral flexible member for securing one end of the cord thereto before beginning winding a cord around the cord holder.

Referring to FIG. 1, located on first end 22 is a first fixedly securable closure member comprising a first elongated leg 14 that terminates in protrusion or knob 14a and a second elongated leg 13 that terminates in protrusion or knob 13a. Each of the legs 13 and 14 are made from a flexible and resilient material such as nylon or the like that allows the legs to flex and bend in response to finger pressure. In the embodiment shown the legs are integral to the body member 11; however, if desired the legs 13 and 14 could be separately secured to body member 11 and made from material different from body member 11. The leg 13 and leg 14 together with body member end 11b coact to define a first cord retaining region 19 on one end of body member 11.

Similarly, located on second end 23 is a second fixedly securable closure member comprising a first elongated leg 15 that terminates in a protrusion or knob 15a and a second elongated leg 16 that terminates in a protrusion or knob 16a. Each of the legs 15 and 16 are made from a flexible and resilient material such as nylon or the like that allows the legs to flex and bend in response to finger pressure. In the embodiment shown the legs are integral to the body member 11 however, if desired the legs 15 and 16 could also be separately secured to body member 11 and preferably are identical to the legs 13 and 14. The leg 15 and leg 16 together with body member end 11c coact to define a second cord retaining region 20 in the opposite end of body member 11.

FIG. 2 is a front or back view of the cord holder 10 for wrapping a cord thereon without out the relief areas 11a shown in FIG. 1. To illustrate the cord guiding feature provide by closure member legs 13 and 14 as well as closure member legs 15 and 16, a set of converging lines 40 and 41 have been sketched with the apex of the lines terminating in the region between legs 13 and 14. Similarly, a set of converging lines 42 and 43 extend into the region between legs 15 and 16 with the apex of the lines remaining in the region between legs 15 and 15. As evident from FIG. 2 the legs, which are in a normally closed but unsecured position, prior to winding a cord on the cord holder 10 would appear to provide an obstruction to winding a cord on the cord holder 10. The legs 13 and 14 and the legs 15 and 16 project outward from the cord holder 10 but are held proximate each other. With the legs projecting outward it forms a cord guide to assist in directing a cord into the cord retaining regions as the cord is wound on the cord holder. Thus, even though there is an obstruction over the ends the alignment of the legs minimizes the snagging of the cords on the closure members as the cord is wound around the cord holder 10. Of course, if desired one could form the legs so that one could fold or bond them out of the way during the cord winding process.

FIG. 2a is a partial front view of the cord holder 10 showing the outward flexing of the legs 15 and 16 to allow a cord 29 to pass therebetween. That is, the normal winding force generated when winding the cord around the body member 11 cause the legs 15 and 16 to flex outwardly allowing the cord 29 to allow the cord slip therepast and into the cord retaining region 20. Thus, a feature of the invention is that the closure members while proximate to each other do not hinder the wrapping of cord 29 around the cord holder. In fact, they can act as a guide to direct the cord into the cord retaining region as evident by the converging of lines 42 and 43 which are drawn tangent to the interior of legs 15 and 16 and indicated a guided path for the cord to follow as it is wound on the cord holder.

To illustrate the securement of a cord in the cord holder reference should be made to FIG. 6 which shows a cord wrapped around cord holder 10 with each of the closure members 13 and 14 fixedly secured to each other as well as the closure members 15 and 16. The fixedly securing of securable closure members allow a user to secure the windings of the cord in the cord retaining region 19 and the cord retaining region 20 without fear that the cord will accidentally unwind.

Referring to FIG. 5 reference numeral 40 identifies an alternate embodiment of the present invention wherein the closure members on each end of the body member 41 are identical to the closure members on cord holder 10 and Cord holder 40. Cord holder 40 differs from cord holder 10 in that on each end there is provided a weakened region identified by reference number 52 and 53. The weakened region 52 allows a knockout section 57 to be removed from body member by flexing on knock out section 57. Similarly, the weakened region 53 allows a knockout section 58 to be removed from the body member 41 to thereby enlarge the cord retaining region 56. Thus with the present invention a user can wrap a cord around the cord holder and twist the legs to secure the cord on the cord holder. However, if the amount of cord is to large the user can merely enlarge the cord retaining regions by removing the knockouts 57 and 58. Thus a user can be assured that the closure members can be used to secure the cord in a tight roll whether the cord has few or many windings on the body of the cord holder.

FIG. 7 is a front view of a cord holder 50 having a body with a flexible member 63 extending from one side of opening 62 to the opposite side of opening 62. Flexible member 63 is integrally formed to body 51 with one end forming a permanent junction therewith and the other end formed with a temporary junction produced by reducing the cross sectional attachment area connecting end 63a to body 51. This allows for molding the cord holder 50 and the flexible member 63 from a single piece of material and allows the flexible member 63 to lie in the same plane as the body 51 during the manufacturing process thus simplifying the manufacturing process. Member 63 achieves its flexibility through the relative size. That is, body 51 has relative stiffness due to the unequal relation of the width to the thickness of the material, the member 63 obtains its flexibility due to the width and thickness of the member being relatively equal.

Located proximate opening 52 in body 51 is a smaller opening 55 for use as a latch hole. The purpose of latch hole 55 is to allow one to extend a free end of member 63 therein and to secure member 63 to body 51. Flexible member 63 contains barbs 54 which are sufficiently large and are arranged in a ramped fashion to facilitate a spreading or flexing to allow the barbs to pass through body 51. Once the barbs 54 have passed through the body 51 the barbs retain the flexible member 63 within body 51. Consequently, once flexible member 63 is inserted into opening 52 the barbs 54 engage the cord holder body to prevent withdrawal therefrom.

FIG. 8 is a side view of the cord holder 50 of FIG. 7 showing the end 63a of flexible member 63 has been pulled free of body 51 while end 63b remains secured to body 51. Flexible member 63 is shown extending around an end of a cord (shown in dashed lines) to hold the cord in postion on cord holder 50. In the embodiment shown the user can insert end of flexible member 63 into hole 55 and pull thereon to snugly engage a free end of a cord to hold the cord in position against body 51. Thus the embodiment of FIG. 7 and FIG. 8 provides for an integral member to secure the end of the cord as the person begins the process of winding a cord around the cord holder 50.

FIG. 9 shows an alternate embodiment of the invention wherein the flexible legs that are twistable about each other are replaced on one end by flexible resilient legs 66 and 67 that are integral with body 61 of cord holder 60 and on the other end by flexible resilient legs 64 and 65 that are integral with body 61 of cord holder 60. The end of each pair of flexible resilient legs 66 and 67 are separated by a distance denoted by "x" and similarly the end of each pair of flexible resilient legs 64 and 65 are also separated by a distance denoted by "x", which creates a guide for pulling a cord between the two ends of the arms. The distance "x" is sufficiently wide so as to present a region where the cord can be pulled through. In an alternate version the distance "x" could be 0 and a notch could be provided on the end of the resilient legs in order to provide a guide for wrapping the cord around the cord holder 60. Reference numeral 69 in FIG. 10 points to the cord guide formed by the ends of legs 66 and 67. Once the cord has been wound around the cord holder body 61 the cord is retained within the confined region 61a and 61b.

Cord holder 60 includes an integral flexible tab 67 which is shown cantilevered outward and is normally located in the plane of body member 61. Tab 67 can be flexed outward to enable an end of a cord to be sandwiched between the body 61 and the tab 67. As the material for the cord holder contains a certain amount of resiliency, the tab 67 can be used to secure one end of the cord thereto as one begins the process of winding the cord around the cord holder.

FIG. 10 shows an end view of cord holder 60 illustrating the planar nature of the cord holder as well as the ends of legs 66 and 67 which form a guide for wrapping a cord therearound.

The present invention includes the method of temporarily storing a cord comprising the steps of: 1. winding a cord around a body member 11; 2. flexing a closure member apart by the pressure of the winding cord to allow the cord to enter a cord retaining region; 3. continuing to wind the cord until a loose end remains; and 4. securing the cord against the body member by closing the securable closure members.

In order to secure the cord in place on the cord holder the method includes the step of twisting the closure member to fixedly secure or lock the cord in position in the cord retaining regions 19 and 20.

If the amount of cord is to large for the retaining region a user can enlarge the cord retaining region by removing knockouts 57 and 58 on the body member 51 to enlarge the cord retaining regions 55 and 56.

In order to prevent the cords from falling off the cord holder during handling the method includes fixedly securing a closure member on each end of the body member to prevent the cord from unwinding from the cord holder.

It is evident that with the present invention a low cost, one-piece, cord holder can be made which can securely hold a cord in a retained position on the cord holder so that the cord does not become accidentally unwound during handling whterhre the cord is an electrial cord or a non-electrical cord.

In addition, the cord holder can be used to store excess lengths of cords on equipment that is in use, which allows a person to avoid the tangling of cords.

I claim:

1. A cord holder comprising:
 a body member, said body member having a first end and a second end;
 a flexible member, said flexible member securable to the body member to hold an end of a cord on the cord holder during a winding of a cord thereon;
 a first securable closure member, said first securable closure member located on said first end of said body member with said first securable closure member and said first end of said body member coacting to define a first closed cord retainer region; and
 a second securable closure member, said second securable closure member located on said second end of said body member with said second securable closure member and said second end of said body member coacting to define a second closed cord retainer region with said first securable closure member and said second securable closure member temporarily separable to allow a cord to be wrapped around said body member for cord storage, said first securable closure member and said second securable closure member fixedly securable to prevent a cord from accidentally falling off said cord holder.

2. The cord holder of claim 1 wherein the cord holder comprises a one piece cord holder with the flexible member including at least one barb thereon for temporarily retaining a free end of the flexible member on the cord holder.

3. The cord holder of claim 1 wherein the body member includes a latch hole for extending the flexible member therethrough.

4. The cord holder of claim 3 wherein the flexible member includes at least two barbs thereon.

5. The cord holder of claim 1 wherein the first securable closure members comprises a first resilient strip and a second resilient strip that can be twisted in to latching engagement with each other.

6. The cord holder of claim 5 including a latch hole in said body member for inserting of a free end of said resilient member therein to enable securing an end of a cord to the cord holder.

7. The cord holder of claim 1 wherein the closure members comprise a pair of legs cantileverly extending toward each other with an end of each of the legs coacting to form a guide for passing of a cord therethrough.

8. The cord holder of claim 7 wherein the resilient legs are curved to form an enclosed cord region.

9. The cord holder of claim 8 wherein the flexible member located on the body member comprises a cantilevered tab for securing an end of a cord thereto.

10. The cord holder of claim 7 wherein a second pair of resilient legs are located on an opposite end of said cord holder.

11. The cord holder of claim 1 wherein the cord holder and the securable closure member are made from nylon.

12. The cord holder of claim 1 wherein the cord holder includes a circular relief area.

13. The method of temporarily storing a cord comprising the steps of:
 fixing a first end of a cord to the body member by an integral flexible member extending from the body member;
 winding a cord around the body member;
 continuing to wind the cord until a free end remains; and
 securing the cord on the body member through a securable closure member located on an end of the body member.

14. The method of claim 13 including the step of twisting a pair of legs in the securable closure member to lock the cord in position.

15. A one stop cord holder that a user can wind and secure a cord to the cord holder by flexing a portion of the cord holder comprising:
 a body member, said body member having a first end and a second end;
 an integral flexible member on said body member for securing an end of cord to the body member as one begins the process of winding a cord on the body member;

a first securable closure member, said first securable closure member secured on said first end of said body member with said first securable closure member having a normally closed but unsecured position to allow passage of a cord therepast, said first end of said body member coacting with said first securable closure member to define a first cord retainer region; and a second securable closure member, said second securable closure member secured to said second end of said body member with said second securable closure member having a normally closed but unsecured position to allow passage of a cord therepast, said second end of said body member coacting to define a second cord retainer region whereby a cord can be wrapped around said body member for cord storage with the winding pressure of the cord causing the cord to slide past the normally closed but unsecured securable closure members with said first securable closure member and said second securable closure member closcable to a secured position to prevent a cord from accidentally falling off said cord holder.

* * * * *